(12) United States Patent
Cuthbert et al.

(10) Patent No.: US 10,496,759 B2
(45) Date of Patent: Dec. 3, 2019

(54) USER INTERFACE FOR REALTIME LANGUAGE TRANSLATION

(71) Applicant: Google LLC, Mountain View, CA (US)

(72) Inventors: Alexander Jay Cuthbert, Oakland, CA (US); Sunny Goyal, Mountain View, CA (US); Matthew Morton Gaba, San Francisco, CA (US); Joshua J. Estelle, San Francisco, CA (US); Masakazu Seno, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/973,722

(22) Filed: May 8, 2018

(65) Prior Publication Data

US 2018/0276203 A1   Sep. 27, 2018

Related U.S. Application Data

(63) Continuation of application No. 15/460,360, filed on Mar. 16, 2017, now Pat. No. 10,002,132, which is a continuation of application No. 14/075,018, filed on Nov. 8, 2013, now Pat. No. 9,600,474.

(51) Int. Cl.
| | | |
|---|---|---|
| *G06F 17/28* | (2006.01) | |
| *G10L 25/48* | (2013.01) | |
| *G10L 15/26* | (2006.01) | |

(52) U.S. Cl.
CPC .......... *G06F 17/289* (2013.01); *G10L 25/48* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 5,357,596 | A | * | 10/1994 | Takebayashi ............. G06F 3/16 704/251 |
| 6,022,222 | A | * | 2/2000 | Guinan .................. G09B 5/065 345/473 |
| 6,496,201 | B1 | | 12/2002 | Baldwin et al. |
| 7,346,515 | B2 | * | 3/2008 | Mizutani ................ G10L 15/22 704/2 |
| 8,972,268 | B2 | | 3/2015 | Waibel et al. |
| 9,197,736 | B2 | | 11/2015 | Davis |
| 9,552,213 | B2 | | 1/2017 | Grabka |
| 9,679,496 | B2 | | 6/2017 | Zilberman |
| 2002/0130904 | A1 | | 9/2002 | Becker et al. |
| 2003/0115059 | A1 | | 6/2003 | Jayaratne |
| 2003/0171912 | A1 | | 9/2003 | Cabello |
| 2003/0208352 | A1 | * | 11/2003 | Lee ..................... G06F 17/2872 704/2 |
| 2005/0010952 | A1 | | 1/2005 | Gleissner |
| 2005/0120046 | A1 | * | 6/2005 | Nakagawa .......... G06F 16/3329 |

(Continued)

OTHER PUBLICATIONS

"SayHi Translate—Voice Translation App for iPhone or iPad for Business," downloaded from the Internet on Nov. 7, 2013 at http://www.sayhitranslate.com/, 7 pages.

*Primary Examiner* — Neeraj Sharma
(74) *Attorney, Agent, or Firm* — Fish & Richardson P.C.

(57) ABSTRACT

A language translation application on a user device includes a user interface that provides relevant textual and graphical feedback mechanisms associated with various states of voice input and translated speech.

17 Claims, 9 Drawing Sheets

Mic turned off manually

(56) References Cited

U.S. PATENT DOCUMENTS

| | | | |
|---|---|---|---|
| 2008/0010068 A1* | 1/2008 | Seita | G09B 19/06 704/257 |
| 2008/0262911 A1 | 10/2008 | Altberg | |
| 2009/0023120 A1 | 1/2009 | Goodman | |
| 2009/0058860 A1* | 3/2009 | Fong | G06F 17/211 345/467 |
| 2010/0003659 A1 | 1/2010 | Edmonds | |
| 2010/0179991 A1* | 7/2010 | Lorch | H04M 1/7253 709/206 |
| 2011/0141218 A1 | 6/2011 | Stancato | |
| 2011/0261030 A1 | 10/2011 | Bullock | |
| 2012/0121108 A1* | 5/2012 | Doubleday | H03G 3/20 381/110 |
| 2012/0134548 A1 | 5/2012 | Rhoads | |
| 2012/0245721 A1* | 9/2012 | Story, Jr. | G06F 3/04842 700/94 |
| 2013/0130211 A1 | 5/2013 | Dohring | |
| 2013/0173246 A1 | 7/2013 | Leung | |
| 2013/0239056 A1 | 9/2013 | Ubillos et al. | |
| 2013/0275899 A1* | 10/2013 | Schubert | G06F 3/0481 715/765 |
| 2014/0039871 A1* | 2/2014 | Crawford | G06F 17/211 704/2 |
| 2014/0078938 A1* | 3/2014 | Lachapelle | A61B 18/245 370/260 |
| 2014/0127667 A1 | 5/2014 | Iannacone | |
| 2014/0143687 A1* | 5/2014 | Tan | G06F 3/1462 715/757 |
| 2014/0222912 A1 | 8/2014 | St. Clair | |
| 2014/0244686 A1 | 8/2014 | Tran et al. | |
| 2014/0250219 A1* | 9/2014 | Hwang | G06F 17/2827 709/224 |
| 2014/0258857 A1 | 9/2014 | Dykstra-Erickson | |

* cited by examiner

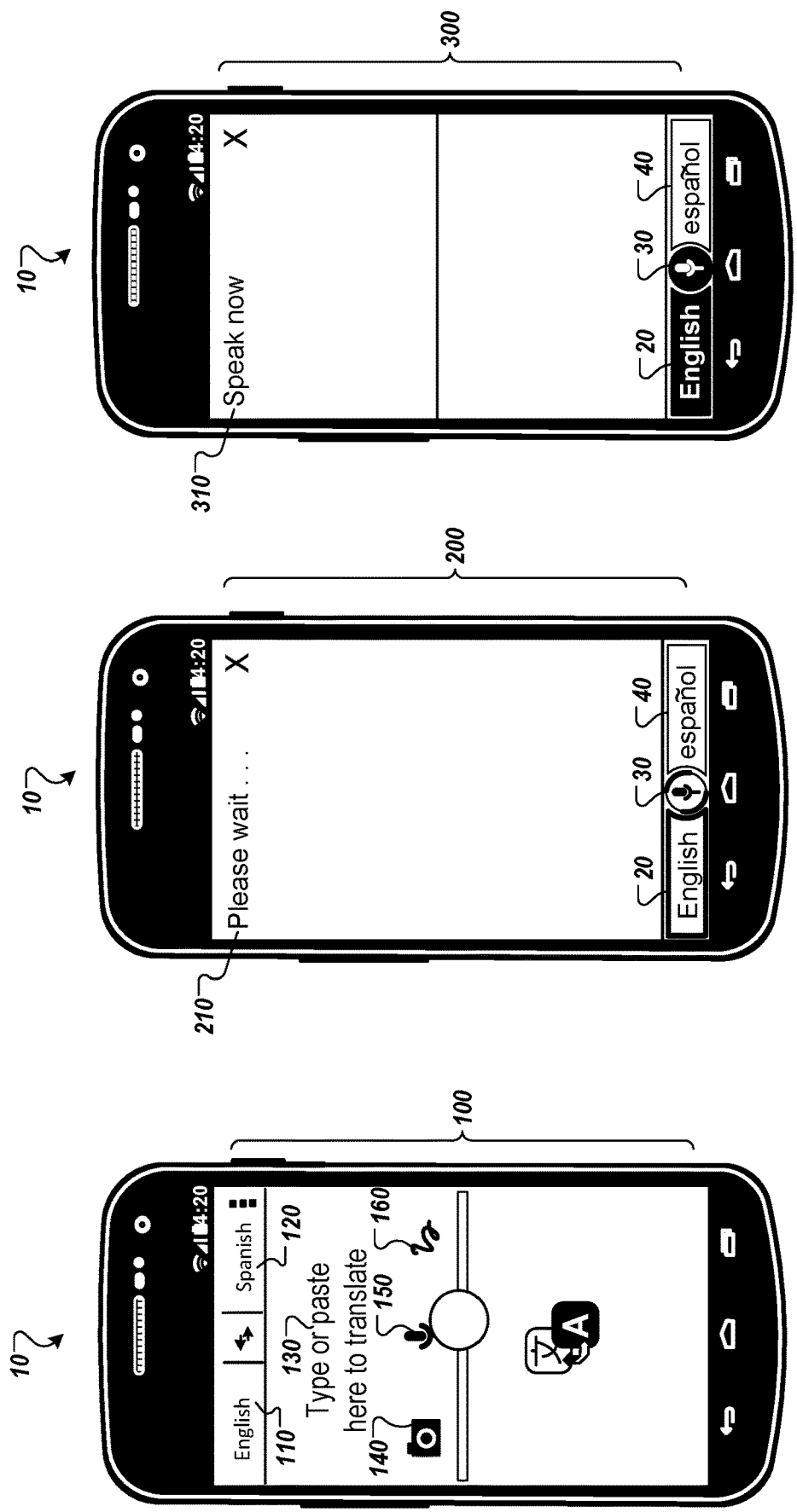

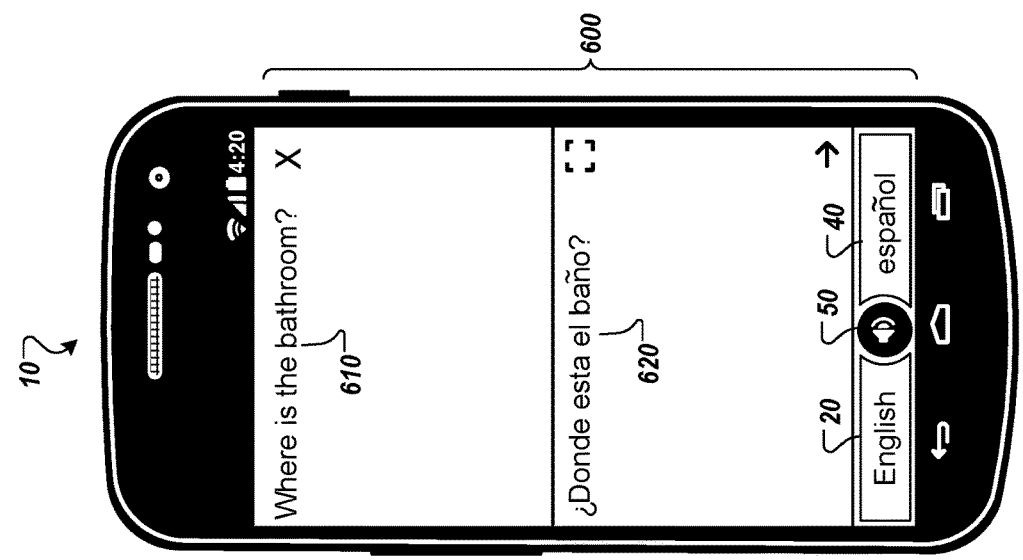
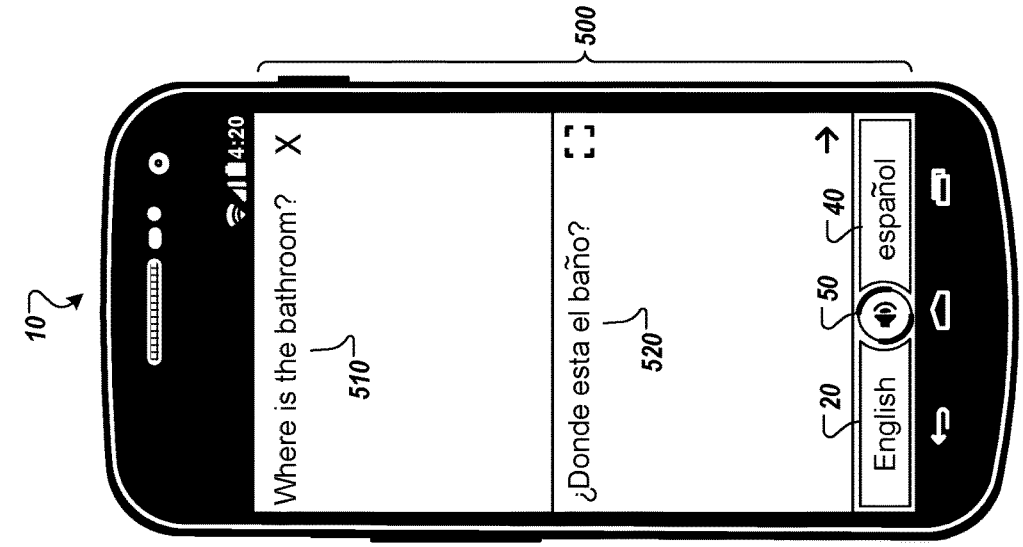
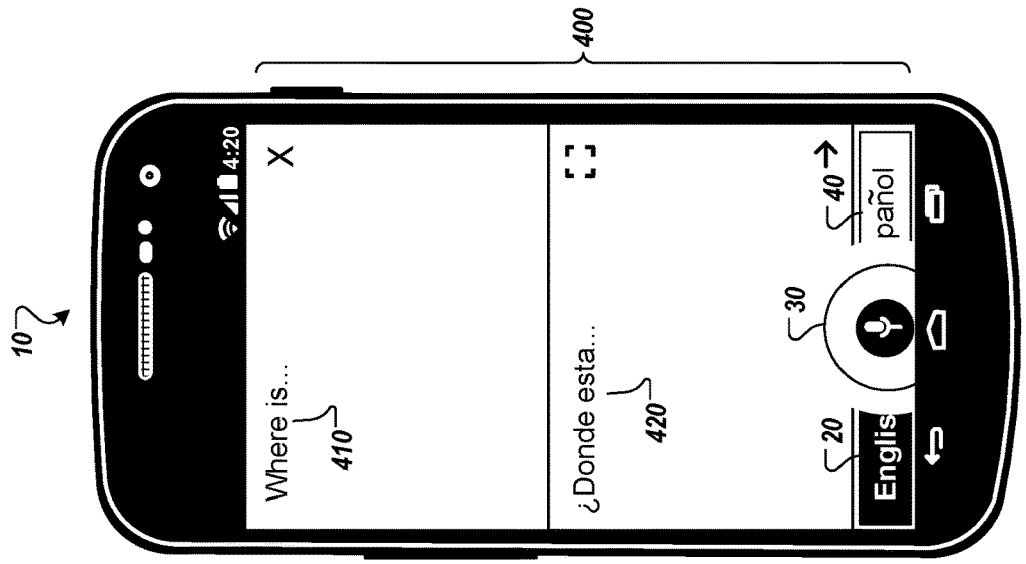

Speech detected

Mic on with localized prompt to speak

Mic turning on over text with localized prompt

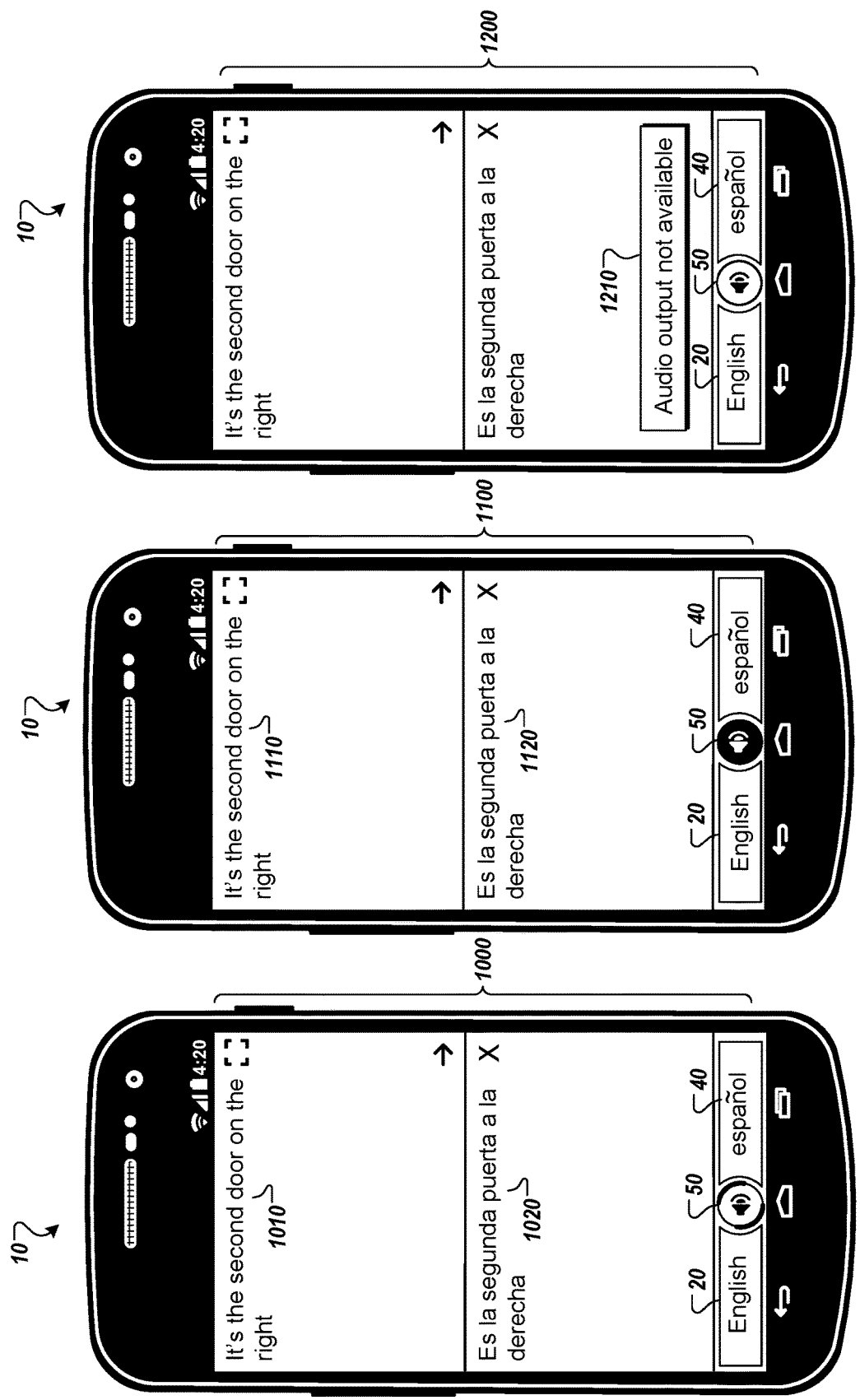

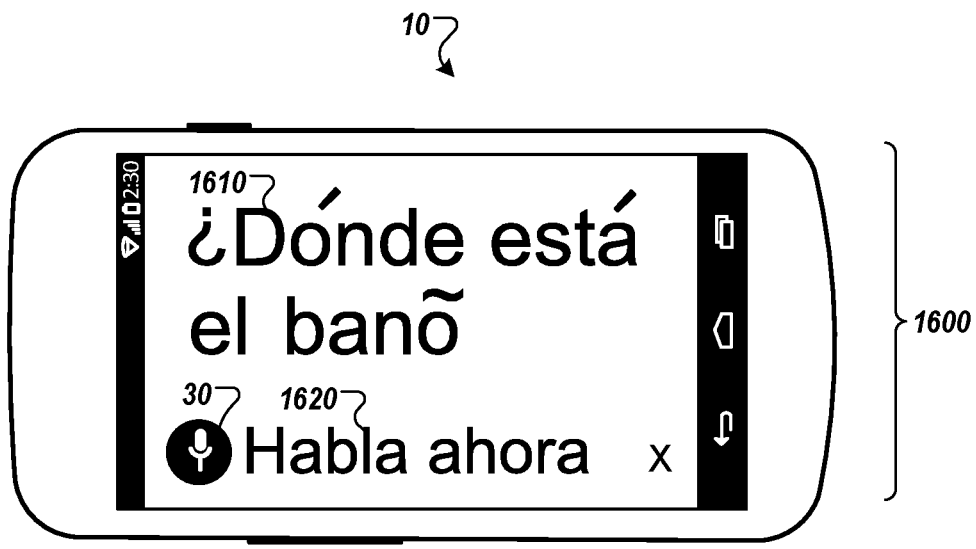
FIG. 16

USER INTERFACE FOR REALTIME LANGUAGE TRANSLATION

CROSS-REFERENCE TO RELATED APPLICATION

This application is a continuation of U.S. application Ser. No. 15/460,360, filed Mar. 16, 2017, which is a continuation of U.S. application Ser. No. 14/075,018, filed Nov. 8, 2013, the contents of which are hereby incorporated by reference.

FIELD

This specification describes technologies related to language translation.

BACKGROUND

Translation may involve more than the activity of a single user translating a sign, menu, message or phrase.

SUMMARY

Some language translation exchanges may involve a first user speaking phrases in a source language to a user device, and one or more participating users providing responses in other languages. These exchanges may involve, for example, combinations of speech recognition, text-to-speech (TTS), and manual activation of the microphone and/or the spoken translation. The combination of speech recognition, translating the source language into a target language, and outputting a translation of the source language into the target language requires coordinating modes for input and output. In some instances, the input and output for the operations involved may overlap, be interrupted, or need to be sequenced to meet user needs, especially in situations involving users speaking different languages. Thus, sequencing the various inputs and outputs through the user interface is desirable.

In general, one aspect of the subject matter includes the actions of displaying a graphical user interface for a language translation application on a user device, the graphical user interface comprising a first graphical representation identifying a source language, a second graphical representation identifying a target language, and a graphical representation of a microphone adjacent to both the first graphical representation and the second graphical representation. The actions also include animating, in response to a request to initiate listening for an utterance in the source language, the graphical representation of the microphone while the language translation application prepares to listen for the source language. The actions further include highlighting, in response to the language translation application completing preparations to listen for the source language, the graphical representation of the microphone and the first graphical representation identifying the source language such that a visual correspondence between the first graphical representation and the graphical representation of the microphone is created. Additionally, the actions include replacing, in response to the language translation application preparing an output of a translation of the utterance into the target language, the graphical representation of the microphone with a graphical representation of a speaker. The actions then include highlighting, in response to the language translation application completing preparations to output the translation of the transcription into the target language, the graphical representation of the speaker and the second graphical representation identifying the target language such that a visual correspondence between the second graphical representation and the graphical representation of the speaker is created.

Some implementations involve animating, in response to the language translation application completing preparations to listen for the source language, the graphical representation of the microphone. In such implementations, animating the graphical representation of the microphone may include animating the graphical representation of the microphone while a microphone of the user device is receiving an audio signal.

In some implementations, the actions may also include animating in response to the language translation application completing preparations to output the translation of the transcription into the target language, the graphical representation of the speaker.

Certain implementations may also include animating, in response to a request to initiate listening for an utterance in the source language, the first graphical representation identifying the source language.

Another general aspect of the subject matter includes the actions of displaying a graphical user interface for a language translation application on a user device, the graphical user interface comprising a first graphical representation indicating a source language and a second graphical representation indicating a target language. The actions further include animating a graphical representation indicating a listening mode in response to preparing to listen for an utterance in the source language. Additionally, the actions include, in response to the language translation application completing preparations to listen for the source language or entering a listening mode, generating a visual link between the graphical representation indicating the listening mode and the graphical representation indicating the source language. Also, the actions include, in response to the language translation application preparing an output of a translation of the utterance into the target language, replacing the graphical representation indicating the listening mode with a graphical representation indicating a translation transcription mode. Then, the actions include, in response to the language translation application entering a translation transcription mode, generating a visual link between the graphical representation indicating the translation transcription mode and the second graphical representation indicating the target language.

Some implementations may advantageously provide textual and graphical feedback mechanisms associated with various states of voice input and translated speech output.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1 to 16 illustrate an example user device that facilitates an exchange between a primary user speaking a first language and a participating user speaking a second language.

DETAILED DESCRIPTION

Figure 9:
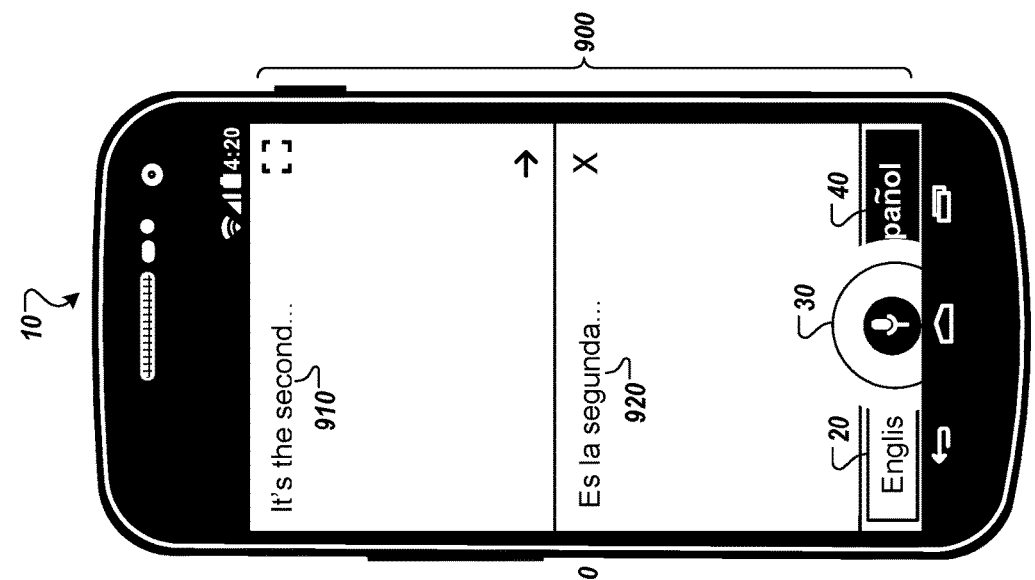

For language translation applications that facilitate interactions between two users speaking different languages, the input and output for voice recognition and spoken translations may overlap, be interrupted, or need to be sequenced to meet user needs. Thus, a challenge with voice input and spoken translations is that there may be multiple modes, steps, delays, failure points, and situations where the user can take an action or set preferences that control behavior of the sequence of interactions.

From a user experience perspective, these sequences have delays and failures that may be indicated with combinations of sound, visual icons, and text messages. Moreover, there may be delays between various steps in the sequence. Furthermore, lack of proper messaging and visual cues may result in user errors. For example, the primary and participating users may speak when the microphone is off, may be unable to determine when spoken text is about to be played back, and may be uncertain about how to take actions when inappropriate or inaccurate translations are about to be displayed or spoken. Similarly, with technical solutions that can support continual speech input and recognition, user experience and technical questions may arise about when to speak translations, when and how to interrupt voice input and spoken translations, and how to control and override, through preferences or actions, the default behaviors.

A language translation application on a user device may include a user interface that provides relevant textual and graphical feedback mechanisms associated with various states of voice input and translated speech. In an example scenario, a primary user (e.g., the owner of a user device) wants to communicate with a participating user who speaks a language different than the language of the primary user. For instance, the primary user may be traveling in a different country and need to ask for directions. The primary user activates the language translation application and receives a visual indication when the application is ready to begin receiving voice input. The primary user then begins speaking in a source language (e.g., the primary user's native language). When the primary user is finished speaking, the language translation application begins to obtain a translation of the primary user's speech into a target language (e.g., the language of the participating user). While this is occurring, the user interface provides a visual indication that the language translation application is preparing to output a translation of the primary user's speech into the target language. When the language translation application obtains the translation, the application outputs the translation (e.g., using TTS) and the user interface provides a visual indication that the translation is being output. The language translation application may then begin listening for the source language and/or the target language, while the user interface provides an appropriate visual indication. This process may repeat for the duration of the exchange between the primary user and the participating user.

Various implementations described herein relate to a user interface for coordinating, messaging, and controlling the various phases of turning on the microphone, capturing speech input, converting speech to text, translating text, displaying the translated text (or partial translations of text), and receiving and playing the translated voice file. Advantageously, such a user interface may provide control and feedback mechanisms of the language selection buttons and input/output controls (visual, auditory, and text) for facilitating translation experiences. In particular, user experience patterns as described herein may provide control and feedback relating to: 1) the microphone state (e.g., on—listening, off, turning on, disabled—not available for this language); and/or 2) speaking the translation (about to speak, speaking, stopped speaking, disabled—not available for this language).

As described herein, various visual indications are used to provide guidance and feedback to users such as, for example, outlining, highlighting, animating, and combinations thereof. Outlining may include, for example, rendering an exterior portion or border of an icon or graphical representation in a different color than the interior portion of the icon or graphical representation. The exterior portion or border may be rendered, for example, in a more bold or intense color than the interior portion. Additionally, in some implementations, outlining may include changing the interior portion of the icon or graphical representation to a different color than the default color (e.g., white). Highlighting may include, for example, changing the color of an icon or graphical representation to a more prominent color so as to promote the icon or graphical representation in the visual hierarchy of the user interface. For example, an entire icon, or a portion of an icon may be changed to a more bold or intense color (e.g., red). Animating may include, for example, changing visual properties of an icon or graphical representation over time. Animations may include, for example, spinning borders, rotation, bounce effects, shake effects, pulse effects, or any other suitable animation that may draw attention to a particular icon or graphical representation. Certain graphical representations may also be described as having a visual correspondence or visual link with each other. A visual correspondence between two representations may include some form of visual connection between the representations such as, for example, both representations having the same or a similar icon, color, animation, outline, highlight, or combination of these.

FIGS. 1 to 13 illustrate a first scenario in which a user device 10 facilitates an exchange between a primary user speaking a source language and a participating user speaking a target language. While the interaction in FIGS. 1 to 13 is described with reference to one primary user and one participating user, two or more participating users may be involved. The user device 10 can be, for example, a desktop computer, laptop computer, a tablet computer, a wearable computer, a cellular phone, a smart phone, a music player, an e-book reader, a navigation system, or any other appropriate computing device.

As illustrated in FIG. 1, the user device 10 displays a sample user interface 100 for initiating an exchange between a primary user and a participating user. In operation, a primary user executes a language translation application on the user device 10 through voice or touch-screen input. Upon execution, the language translation application may provide an input screen, such as that shown in FIG. 1. In this regard, FIG. 1 includes an input section for selecting language. The primary user may select a first language (e.g., a source language) using input box 110 and a second language (e.g., a target language) using input box 120. For example, the primary user may select English in the first input box 110 and Spanish in the second input box 120. In this context, the first language is typically the language of the primary user and the second language is typically the language of the participating user. Voice or touch-screen inputs may be used to make the selection. Alternatively or in addition, the language translation application may select a default language to be the first language. This default language may be based on the current language setting of the user device 10. The language translation application also may select a default language to be the second language, which may be a language that is spoken in the current geographic location of the user device 10. For example, if the user device 10 is currently located in Spain, the default second language may be Spanish.

The user may then select a mode for inputting the speech or text that is to be translated. For example, the user may type or paste text into the text box 130, select a camera icon 140 to take a picture of text with a camera coupled to the user device, select a microphone icon 150 to initiate speech recognition, or select a handwriting icon 160 to initiate handwriting recognition. For speech recognition, the user may, for example, select the microphone icon. For handwriting recognition, the user may, for example, select the handwriting icon 160 and then write and the input area 130 using a digit or stylus. The user device 10 then performs handwriting recognition on the inputted writing.

As illustrated in FIG. 2, the user device 10 displays a sample user interface 200 in an initial state for beginning a speech recognition session. The user interface 200 may be displayed, for example, while the language translation application initializes the microphone and prepares to receive voice input in the source language from the primary user. The user interface 200 includes a caption "please wait" 210 that indicates that the user device is preparing to receive input from the primary user. The user interface 200 also includes a graphical representation 20 identifying the source language (e.g., an "English" icon), a graphical representation of a microphone 30 (e.g., a microphone icon), and a graphical representation 40 identifying the target language (e.g., a "Spanish" icon). The microphone icon 30 is arranged between (e.g., adjacent to) the graphical representation 20 identifying the source language and the graphical representation 40 identifying the target language. Collectively, the graphical representation 20 and the graphical representation 40 may be referred to as language selectors.

In the initial state illustrated in FIG. 2, the graphical representation 20 identifying the source language has been outlined (e.g., the exterior portion of the English icon has been rendered in a different color than the interior portion of the icon). The outlining of the graphical representation 20 indicates to the primary user that the language translation application is preparing to listen for voice input in the source language (e.g., English). Likewise, the microphone icon 30 has a visual indication that the language translation application is preparing to listen with a microphone of the user device 10. In this example, the visual indication is an animated outline that rotates around the periphery of the microphone icon. In this example, exterior portions of the microphone icon that change over time in a spinning pattern are rendered in a different color than the interior of the microphone icon.

In some situations, the delay while the microphone is initializing may cause errors because a user may speak too quickly, especially in exchanges that involve two or more users. Advantageously, by creating a visual correspondence between the graphical representation 20 and the microphone icon 30 while the microphone is initializing, the primary user may readily recognize the current state of the language translation application, i.e. that the language translation application is preparing to listen for voice input in English. This may address the situation where users view the language selector (e.g., the graphical representation 20) and the microphone icon 30 as two separate controls. Users who view these as separate controls may first tap on the language selector to select the language and then tap on the microphone icon 30 to turn on the microphone. However, since the language selector and the microphone may be linked in the user interface, the effect may be to disable the microphone, which is not what the user intended. By visually connecting these elements, users are better able to understand that language selection and voice input are associated functions.

As illustrated in FIG. 3, the user device 10 displays a sample user interface 300 for receiving voice input from the primary user. The user interface 300 may be displayed, for example, when the language translation application has completed initializing a microphone and is ready to receive voice input in the source language from the primary user. The sample user interface 300 includes a caption "speak now" 310 that indicates that the language translation application is waiting for speech input from the primary user.

In the state illustrated in FIG. 3, the user interface 300 displays a graphical indication that the user device 10 is ready to receive voice input in English for translation to Spanish. In particular, the graphical representation 20 identifying the source language has been highlighted (e.g., the color of the English icon has been changed from an original color to a more prominent color). The highlighting of the graphical representation 20 indicates to the primary user that the language translation application is listening for voice input in the source language (e.g., English). Likewise, the microphone icon 30 is highlighted to create a visual indication that the language translation application is ready to listen with a microphone of the user device 10. The visual correspondence between the graphical representation 20 and the microphone icon 30 may permit the primary user to more easily recognize the current state of the language translation application, i.e. that the language translation application is ready to listen for voice input in English.

When the primary user begins speaking, the user device 10 receives the primary user's speech and converts that speech into audio data. The user device 10 encodes the speech into an audio signal, which may be, for example, a snippet of relatively high quality audio, such as 16 kHz lossless audio, and initiates speech recognition as described below.

Speech recognition involves converting audio data into text representing speech. A speech recognizer may include subroutines for recognizing words, parts of speech, and the like. For example, the speech recognizer may include a speech segmentation routine for breaking sounds into sub-parts and using those sub-parts to identify words, a word disambiguation routine for identifying meanings of words, a syntactic lexicon to identify sentence structure, parts-of-speech, etc., and a routine to compensate for regional or foreign accents in the user's language. The text output by speech recognizer may be a file containing text in a self-describing computing language, such as XML (eXtensible Markup Language), JavaScript Object Notation (JSON), or any other suitable format. Self-describing computing languages may be useful in this context because they enable tagging of words, sentences, paragraphs, and grammatical features in a way that is recognizable to other computer programs. Thus, another computer program can read the text file, identify, e.g., words, sentences, paragraphs, and grammatical features, and use that information as needed.

The speech recognition may be performed, for example, by the user device 10, by a server, or by a combination of both. For example, the user device 10 may include a speech recognition module that generates a transcription of the primary user speech from the audio data. Alternatively or in addition, the user device 10 may send the audio data to a speech recognition program at a server via a network. The network may be wired or wireless or a combination of both and can include the Internet. In some implementations, identifiers corresponding to the first and second languages may be sent along with the audio data, or before or after the audio data. The speech recognition program at the server receives the audio data and, if applicable, language identifiers from the user device 10. The speech recognition program at the server may then perform speech recognition on the primary user's utterance based on the language identifier associated with the audio data. The server may then transmit a transcription of the primary user's utterance back to the user device 10.

The language translation application also translates the voice input into the target language. In some implementations, the language translation application may perform partial translations of voice input while the primary user is speaking. Alternatively or in addition, the language translation application may translate voice input at identified endpoints. The translation of the primary user's speech may be performed by the user device 10, by a translation program at a server, or by a combination of both. For example, the user device 10 may include a language translation module or dictionary for translating the first language (i.e., the language of the primary user) into the second language (i.e., the language of the participating user). In some implementations, the user device 10 may access a translation service via a network, which translates a transcription of the primary user's utterance in the first language into text representing the primary user's utterance in the second language.

In some implementations, a translation program at a server may translate the primary user's utterance into the second language. The translation program may identify the first and second languages, by for example, recognizing identifiers. In some implementations, the second language may be a default language based on the location of the user device 10. In such a case, the translation program may identify the default second language based on, for example, the IP address of the user device, along with any other geographic indicia that it can determine from the audio data. The translation program may then consult a database or any other source to identify the primary language spoken at the geographic location of the user device. If a location is known to be bilingual (e.g., Barcelona, Spain), the translation program may send a message to the user device to prompt the user to select an appropriate language from a list of languages spoken in a location (e.g., Catalan or Spanish for Barcelona). Based on the identified languages, the translation program translates a transcription of the primary user's utterance into text representing the primary user's utterance in the second language. The server may then transmit the text translation back to the user device 10 for display.

The language translation program reads the text file output by the speech recognizer and uses this text file in the primary user's native language to generate a text file for a pre-specified target language (e.g., the language of the participating user). For example, the language translator may read an English-language text file and generate a Spanish-language text file based on the English-language text file. To perform the translation, the language translator identifies the vocabulary and grammar of the English-language text contained in the text file generated by the speech recognizer and uses the tools at its disposal to generate a text file (e.g., an XML file) containing a Spanish-language translation of the English-language text. The language translator may include, or reference, an electronic dictionary that correlates the user's native language to the target language. The language translator may also include, or reference, a syntactic lexicon in the target language to modify word placement in the target language relative to the native language, if necessary. For example, in English, adjectives typically precede nouns. By contrast, in some languages, such as Spanish, (most) adjectives follow nouns. The syntactic lexicon may be used to set word order and other grammatical features in the target language based on, e.g., tags contained in the English-language text file. The output of language translator may be a text file similar to that produced by the speech recognizer, except that it is in the target language. The text file may be in a self-describing computer language, such as XML, JSON, or any other suitable format.

As illustrated in FIG. 4, the user device 10 displays a sample user interface 400 while the language translation application is receiving voice input from the primary user and performing a translation of the primary user's speech. The user interface 400 may be displayed, for example, while the language translation application determines that a microphone on the user device 10 is currently receiving an audio signal. A top portion of the user interface 410 includes a partial transcription of the primary user's speech (i.e., "Where is") and a bottom portion of the user interface 420 includes a partial translation of the transcription (i.e., " ¿ Donde esta").

In the state illustrated in FIG. 4, the user interface 400 displays a graphical indication that the user device 10 is currently receiving voice input in English for translation to Spanish. In particular, the graphical representation 20 identifying the source language has been highlighted, which indicates to the primary user that the language translation application is receiving a voice input in the source language (e.g., English). Likewise, the microphone icon 30 is animated (e.g., with a pulse effect) and highlighted to create a visual indication that the language translation application is receiving voice input with a microphone of the user device 10. The visual correspondence between the graphical representation 20 and the microphone icon 30 may permit the primary user to more easily recognize the current state of the language translation application, i.e. that the language translation application is receiving voice input in English.

When the language translation application determines that an endpoint in the voice input has been reached, the application outputs a spoken translation of the voice input. The language translation application may automatically identify endpoints in voice input and/or may receive manual inputs from the primary user to identify endpoints. For example, in some implementations the language translation application may identify endpoints based on speech recognition techniques for parsing voice inputs. Alternatively or in addition, the primary user may tap on one or more of the graphical representations 20, 30, 40 as described in more detail below to manually identify endpoints.

As illustrated in FIG. 5, the user device 10 displays a sample user interface 500 while the language translation application prepares to output a spoken translation of the primary user's speech into the target language. The user interface 500 may be displayed, for example, while the language translation application obtains and/or generates an audio signal corresponding to a translation of the primary user's speech. A top portion of the user interface 510 includes a full transcription of the primary user's speech (i.e., "Where is the bathroom") and a bottom portion of the user interface 520 includes a translation of the transcription (i.e., "¿ Donde esta el baño").

In the state illustrated in FIG. 5, the user interface 500 displays a graphical indication that the user device 10 is preparing to output a spoken translation of the primary user's speech into Spanish. In particular, a speaker icon 50 has replaced the microphone icon 30. In addition, the speaker icon 50 has an animated outline to create a visual indication that the language translation application is preparing to output a spoken translation from a speaker of the user device 10. In this example, exterior portions of the speaker icon 50 that change over time in a spinning pattern are rendered in a different color than the interior of the speaker icon. In some implementations, the graphical representation 40 identifying the target language may also be outlined during the state.

Visual styling and consistency between the language selectors and microphone icon may be extended to the voice output functionality. As described above, when the translated text is about to be spoken, the microphone icon 30 changes to a speaker icon 50. In some cases, there may be a delay between the time the user has spoken, the translated text has been returned, and the translated voice file is ready to be played. During this time, the animation of the speaker icon provides an indication that the microphone is turning on. Additionally, it may be desirable to visually indicate the language that is about to be output. At least two non-exclusive options are available: 1) highlight the graphical representation 20 identifying the target language while outputting the spoken translation; and/or 2) indicate that the source language is not active with a subtle indication that the target language is active. For longer conversations option 1 may be more desirable. In other cases, option 2 may be preferable to avoid flashing back and forth between source and target language selectors for short translations.

As illustrated in FIG. 6, the user device 10 displays a sample user interface 600 while the language translation application outputs an audio signal corresponding to a spoken translation of the primary user's speech into the target language. A top portion of the user interface 610 includes a full transcription of the primary user's speech (i.e., "Where is the bathroom") and a bottom portion of the user interface 620 includes a translation of the transcription (i.e., "¿ Donde esta el baño").

In the state illustrated in FIG. 6, the user interface 600 displays a graphical indication that the user device 10 is currently outputting a spoken translation of the primary user's speech into Spanish. In particular, the speaker icon 50 has been highlighted to create a visual indication that the language translation application is outputting a spoken translation from a speaker of the user device 10. In some implementations, the speaker icon 50 may be animated (e.g., using a pulse effect) during the state. Alternatively, the speaker icon 50 may not be highlighted (e.g., it may have the default background) while outputting the spoken translation. In some implementations, the graphical representation 40 identifying the target language may also be highlighted during this state. In such implementations, the visual correspondence between the graphical representation 40 and the speaker icon 50 may permit the primary user to more easily recognize the current state of the language translation application, i.e. that the language translation application is outputting a spoken translation in Spanish.

The audio signal corresponding to a spoken translation of the primary user's speech into the target language may be generated by the user device 10, by a server, or by any suitable combination of both. An audio generator, at the user device or the server, reads the text file output by the language translator described above and generates audio data based on text in the text file. In particular, the audio generator uses a voice synthesizer to generate audio data corresponding to a text file. The voice synthesizer may use any indicators associated with the generated audio data to affect how the speech is synthesized (e.g., to provide a gender-specific or accent-specific speech type). Since the text file is organized according to the second language (e.g., the participating user's language), the audio data generated is for speech in the second language. In the example illustrated in FIG. 6, the audio generator would read the text file generated by the language translator, and use the Spanish-language text to generate audio data that can be played to generate Spanish speech corresponding to the text. The audio data may be generated with one or more indicators to synthesize speech having accent or gender characteristics. For example, an indicator may specify, to the user device 10, that the resulting speech is for a man or woman. The accent may be specific to the user device on which the audio data is to be played. For example, if the language conversion is from English to Spanish, and the user device is located in Spain, the audio generator may include an indicator to synthesize Spanish speech in a Castilian accent. In cases where the audio generator is located at the server, the server may transmit the audio signal corresponding to the Spanish translation to the user device 10.

The user device 10 obtains the generated audio data for the target language and plays the synthesized speech for the participating user. The participating user is thereby able to receive, in his native (or preferred) language, an audible translation of speech provided by the primary user in the participating user's native (or preferred) language. In the example shown in FIG. 6, the participating user receives an audio translation into Spanish of the primary user's English language speech.

In some implementations, the steps described with reference to FIGS. 5 and 6 may be omitted. For example, the user device 10 may receive the primary user's speech and provide a text translation without outputting a spoken translation of the primary user's speech.

Figure 7:
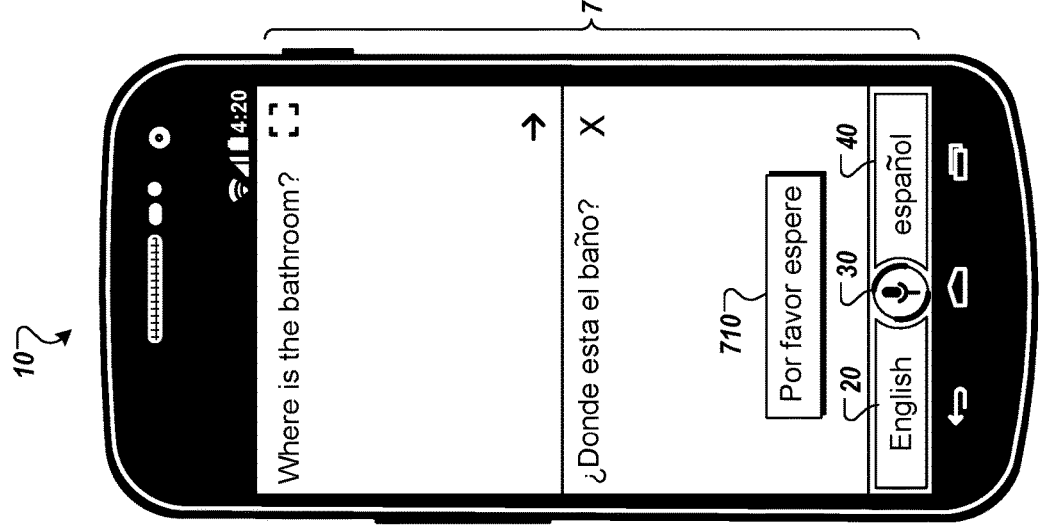

Once the user device 10 completes outputting a spoken translation of the primary user's speech, the language translation application may then begin listening for the participating user's response in the target language. As illustrated in FIG. 7, the user device 10 displays a sample user interface 700, while the language translation application prepares to receive voice input in the target language from the participating user. The user interface 700 includes a prompt "por favor espere" 710 in the target language. The prompt 710 is displayed in the lower portion of the user interface 700 that includes the textual translation of the primary user's speech into the target language. In this example, the screen of the user device 10 could be shown to the participating user to inform the participating user of the current state of the language translation application in the participating user's native language.

In the state illustrated in FIG. 7, the microphone icon 30 has an animated outline to create a visual indication that the language translation application is preparing to listen for speech in the target language. In this example, exterior portions of the microphone icon that change over time in a spinning pattern are rendered in a different color than the interior of the microphone icon. In some implementations, the graphical representation 40 identifying the target language may also be outlined. The outlining of the graphical representation 20 may indicate that the language translation application is preparing to listen for voice input in the target language (e.g., Spanish).

Figure 8:
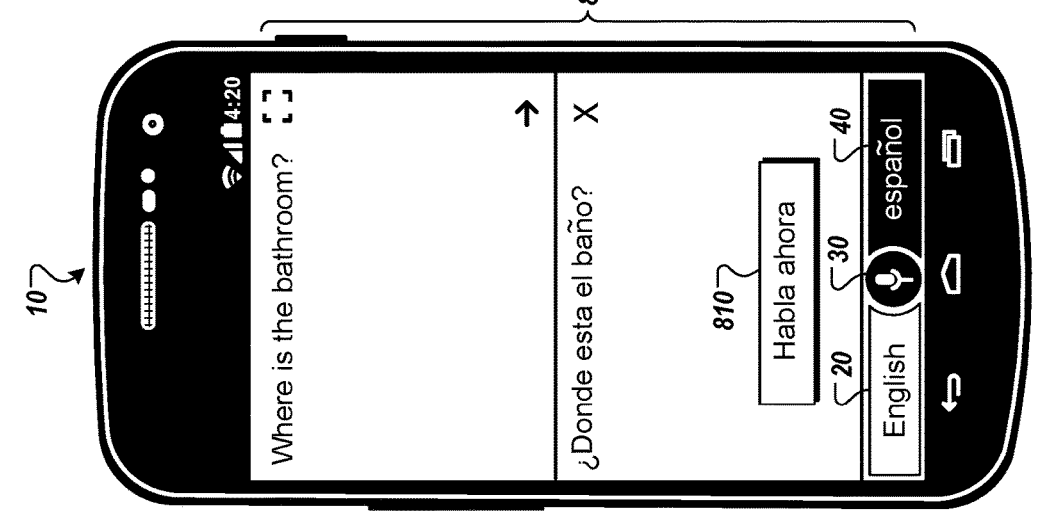

As illustrated in FIG. 8, the user device 10 displays a sample user interface 800 for receiving voice input from the participating user. The user interface 800 may be displayed, for example, when the language translation application has completed initializing a microphone and is ready to receive voice input in the target language from the participating user. The sample user interface includes a prompt "habla ahora" 810 that indicates that the language translation application is waiting for speech input from the primary user. The prompt 810 is displayed in the lower portion of the user interface 800 that includes the textual translation of the primary user's speech into the target language.

In the state illustrated in FIG. 8, the user interface 800 displays a graphical indication that the user device 10 is ready to receive voice input in Spanish for translation to English. In particular, the graphical representation 40 identifying the target language has been highlighted (e.g., the color of the Spanish icon has been changed from an original color to a more prominent color). The highlighting of the graphical representation 40 indicates to the primary user that the language translation application is listening for voice input in the target language (e.g., Spanish). Likewise, the microphone icon 30 is highlighted to create a visual indication that the language translation application is ready to listen with a microphone of the user device 10. The visual correspondence between the graphical representation 40 and the microphone icon 30 may permit the primary user and participating user to more easily recognize the current state of the language translation application, i.e. that the language translation application is ready to listen for voice input in Spanish.

When the participating user begins speaking, the user device 10 receives the participating user's speech and converts that speech into audio data as described above. As illustrated in FIG. 9, the user device 10 displays a sample user interface 900 while the language translation application is receiving voice input from the participating user and performing a translation of the participating user's speech. The user interface 900 may be displayed, for example, while the language translation application determines that a microphone on the user device 10 is currently receiving an audio signal. A top portion of the user interface 910 includes a translation of the participating user's speech into the source language (i.e., "It's the second") and a bottom portion of the user interface 920 includes a partial transcription of the participating user's speech (i.e., "Es la segunda").

In the state illustrated in FIG. 9, the user interface 900 displays a graphical indication that the user device 10 is currently receiving voice input in Spanish for translation to English. In particular, the graphical representation 40 identifying the target language has been highlighted, which indicates that the language translation application is receiving a voice input in the target language (e.g., Spanish). Likewise, the microphone icon 30 is animated (e.g., with a pulse effect) and highlighted to create a visual indication that the language translation application is receiving voice input with a microphone of the user device 10. The visual correspondence between the graphical representation 40 and the microphone icon 30 may permit the primary user to more easily recognize the current state of the language translation application, i.e. that the language translation application is receiving voice input in Spanish.

As illustrated in FIG. 10, the user device 10 displays a sample user interface 1000 while the language translation application prepares to output a spoken translation of the participating user's speech into the source language. The user interface 1000 may be displayed, for example, while the language translation application obtains and/or generates an audio signal corresponding to a translation of the participating user's speech. A top portion of the user interface 1010 includes a translation of the participating user's speech into the source language (i.e., "It's the second door on the right") and a bottom portion of the user interface 1020 includes a full transcription of the participating user's speech (i.e., "Es la segunda puerta a la derecha").

In the state illustrated in FIG. 10, the user interface 1000 displays a graphical indication that the user device 10 is preparing to output a spoken translation of the participating user's speech into English. In particular, a speaker icon 50 has replaced the microphone icon 30. In addition, the speaker icon 50 has an animated outline to create a visual indication that the language translation application is preparing to output a spoken translation from a speaker of the user device 10. In some implementations, the graphical representation 20 identifying the source language may also be outlined during the state.

As illustrated in FIG. 11, the user device 10 displays a sample user interface 1100 while the language translation application outputs an audio signal corresponding to a spoken translation of the participating user's speech into the source language. A top portion of the user interface 1110 includes a translation of the participating user's speech into the source language (i.e., "It's the second door on the right") and a bottom portion of the user interface 1120 includes a full transcription of the participating user's speech (i.e., "Es la segunda puerta a la derecha").

In the state illustrated in FIG. 11, the user interface 1100 displays a graphical indication that the user device 10 is currently outputting a spoken translation of the participating user's speech into English. In particular, the speaker icon 50 has been highlighted to create a visual indication that the language translation application is outputting a spoken translation from a speaker of the user device 10. In some implementations, the speaker icon 50 may be animated (e.g., using a pulse effect) during the state. In some implementations, the graphical representation 20 identifying the source language may also be highlighted during this state. In such implementations, the visual correspondence between the graphical representation 20 and the speaker icon 50 may permit the primary user to more easily recognize the current state of the language translation application, i.e. that the language translation application is outputting a spoken translation into English. The audio signal corresponding to the spoken translation of the participating user's speech into the source language may be generated as described above.

In some instances as illustrated in FIG. 12, an audio signal corresponding to a translation of the participating user's speech into the source language may not be available. For example, the user device 10 and/or server may have experienced an error during translation or the user device may lack network connectivity with the server. In such instances, a prompt 1210 indicating "audio output not available" may be displayed to indicate that no spoken translation of a voice input will be forthcoming.

In some instances, a user may manually interrupt a translation session. For example, tapping the microphone icon or the graphical representation 20, 40 may suspend the session to allow correction through keyboard or voice input. In this case, the microphone and the language selectors may be disabled, but with a visual indication of the selected default language. This indication conveys the idea that tapping the microphone will start listening for the selected default language.

As another example, tapping the speaker icon may display the text translation (which may already be present when partial translations are displayed) and may stop any pending spoken translations from being output. The language translation application may also disable the microphone and provide a visual indication of the selected default language.

Figure 13:
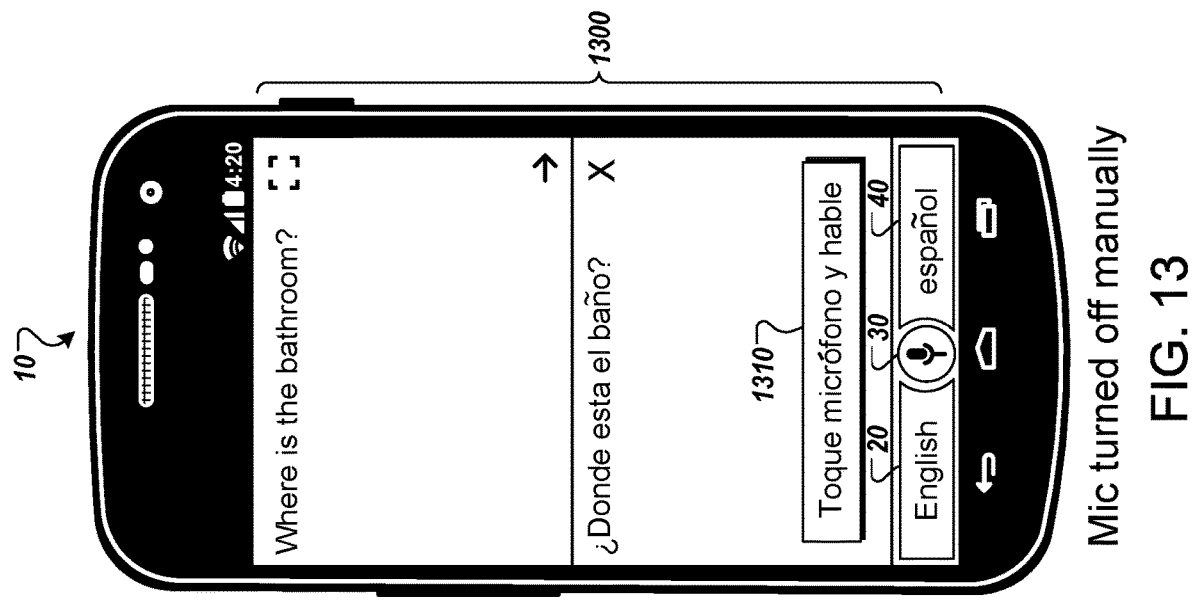

Referring back to the sample user interface 800 shown in FIG. 8, for example, a preferred interaction sequence would involve the participating user speaking a response to the primary user's question. However, assume that instead, the participating user or the primary user tapped the microphone icon 30 or either graphical representation 20, 40. In this case, the translation session may be suspended as shown in FIG. 13, and a prompt 1310 indicating that the primary user or participating user may resume the session (e.g., "toque micrófono y hable") may be displayed.

Figure 14:
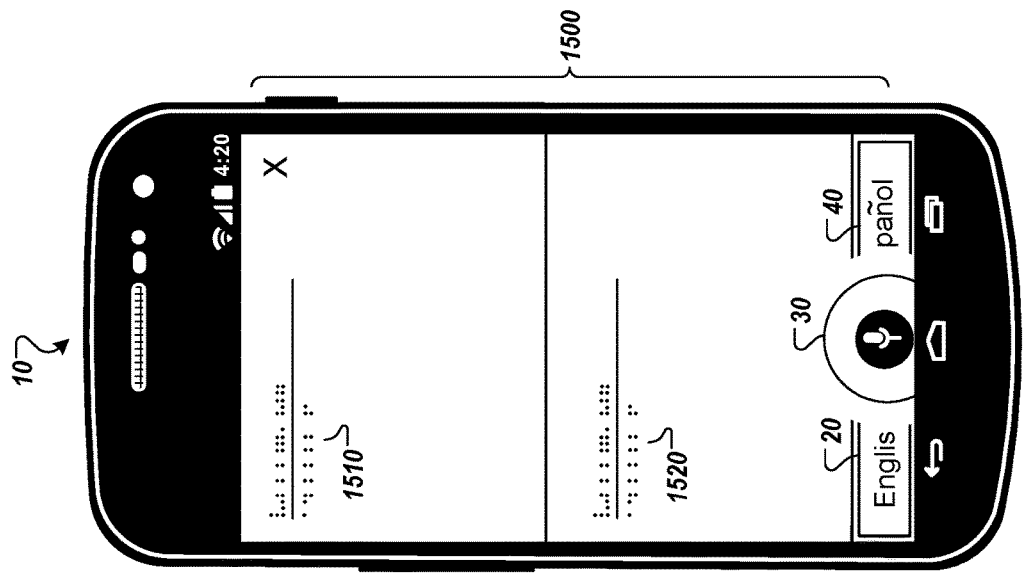
Figure 15:
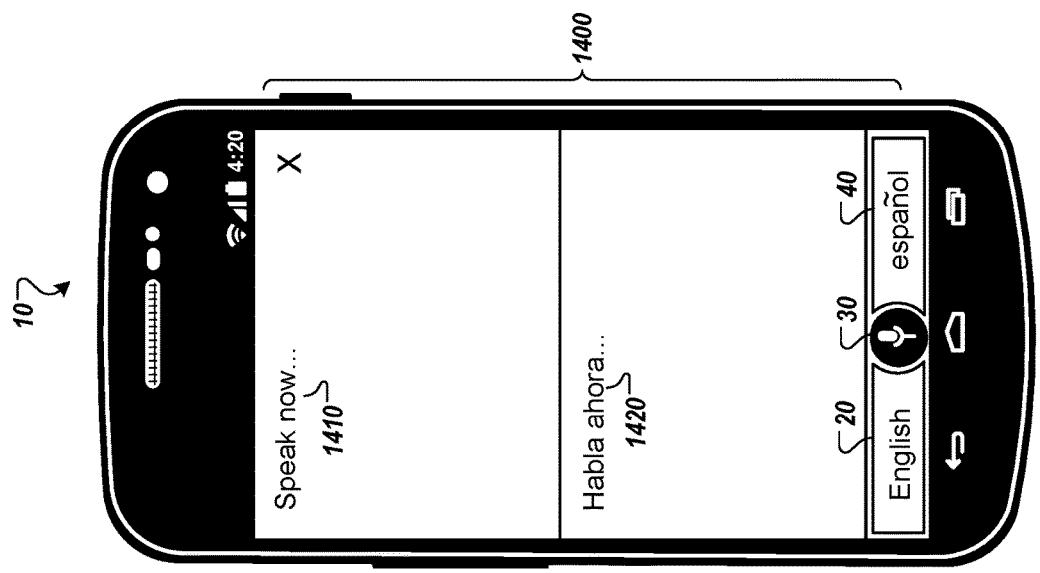

FIGS. 14 and 15 illustrate another scenario in which a user device 10 facilitates an exchange between a primary user speaking a source language and a participating user speaking a target language. In this scenario, the language translation application listens for speech in a language that is not known a priori, i.e., the speech may be in either the source language or the target language, and performs continuous speech recognition giving priority to the language translation stream having the highest confidence level. For example, the language translation application may simultaneously attempt to translate a voice input into both the source language and the target language. In particular, the application may perform speech recognition on the voice input using a speech recognition model corresponding to the source language, and assign a confidence value to the transcription. At the same time, the application may perform speech recognition on the voice input using a speech recognition model corresponding to the target language, and assign another confidence value to this transcription. When an endpoint in the voice input is reached, these confidence levels are compared and the transcription corresponding with the higher confidence level may be selected and displayed. A translation of the selected transcription may then be displayed in the appropriate portion of the user interface. For example, when the transcription associated with the source language has a higher confidence level than the transcription associated with the target language, a transcription of the voice input in the source language may be selected and displayed, and a translation of the transcription into the target language may be displayed.

As illustrated in FIG. 14, the user device 10 shows a sample user interface 1400 that includes a prompt to speak in both the source language in the target language. A prompt in English "speak now" is shown in a top portion 1410 of the user interface 1400, and a prompt in Spanish "habla ahora" is shown in a bottom portion 1420. In the state illustrated in FIG. 14, the microphone icon 30 is highlighted to create a visual indication that the language translation application is ready to listen with a microphone of the user device 10. Because the language of the voice input is not known, neither the graphical representation 20 nor the graphical representation 40 are outlined or highlighted.

As illustrated in FIG. 15, the user device 10 displays a sample user interface 1500 while the language translation application is receiving voice input and performing speech recognition. The user interface 1500 may be displayed, for example, while the language translation application determines that a microphone on the user device 10 is currently receiving an audio signal. The top portion of the user interface 1510 and the bottom portion of the user interface 1520 both display a pattern (e.g., Braille) to indicate that voice input is being received but no transcription or translation is available.

In this scenario, a user may manually select a specific language button (e.g., graphical representation 20 identifying the source language or graphical representation 40 identifying the target language) to listen for only that language. In this case the language translation application switches into the behavior patterns described with reference to FIGS. 1 to 13.

FIG. 16 illustrates an example scenario that involves the user device 10 being rotated into landscape mode. In this scenario, while the language translation application is preparing to output a spoken translation in the target language, the user device 10 displays a sample user interface 1600 having a full-screen screen translation of the primary user's speech into the language of the participating user. The user interface 1600 shows the translation 1610 "¿ Dónde está el baño?" and a caption 1620 ("habla ahora") to request that the participating user respond. In this scenario, the microphone icon 30 may remain hidden until the language translation application is ready to listen for the target language. When the language translation application is ready to listen for the target language, the microphone icon 30 may be displayed and highlighted. FIG. 16 also shows the participating user verbally responding to the primary user's question in the participating user's native language ("es la segunda puerta a la derecha"). The participating user's speech may then be transcribed and translated in a similar manner as described above.

In some implementations, the user may use a gesture (e.g., shaking the user device 10) to initiate the process of turning on the microphone. Advantageously, allowing a gesture such as shaking to enable the microphone may be easier than attempting to tap the microphone icon 30 when the screen is positioned toward a participating user.

In another scenario involving the user device 10 in landscape mode (not shown) the user interface for the language translation application shows full screen text. In this scenario, the user interface may also include a microphone icon that a user may tap to enter voice input mode and/or a graphical representation identifying the source or target language to commence listening. In some implementations, the user may use a gesture (e.g., shaking the user device 10) to enable the microphone, start listening in the language displayed, and display a prompt to "speak now" next to the microphone icon. Advantageously, allowing a gesture such as shaking to enable the microphone may be easier than attempting to tap the microphone icon when the screen is positioned toward a participating user.

Figure 17:
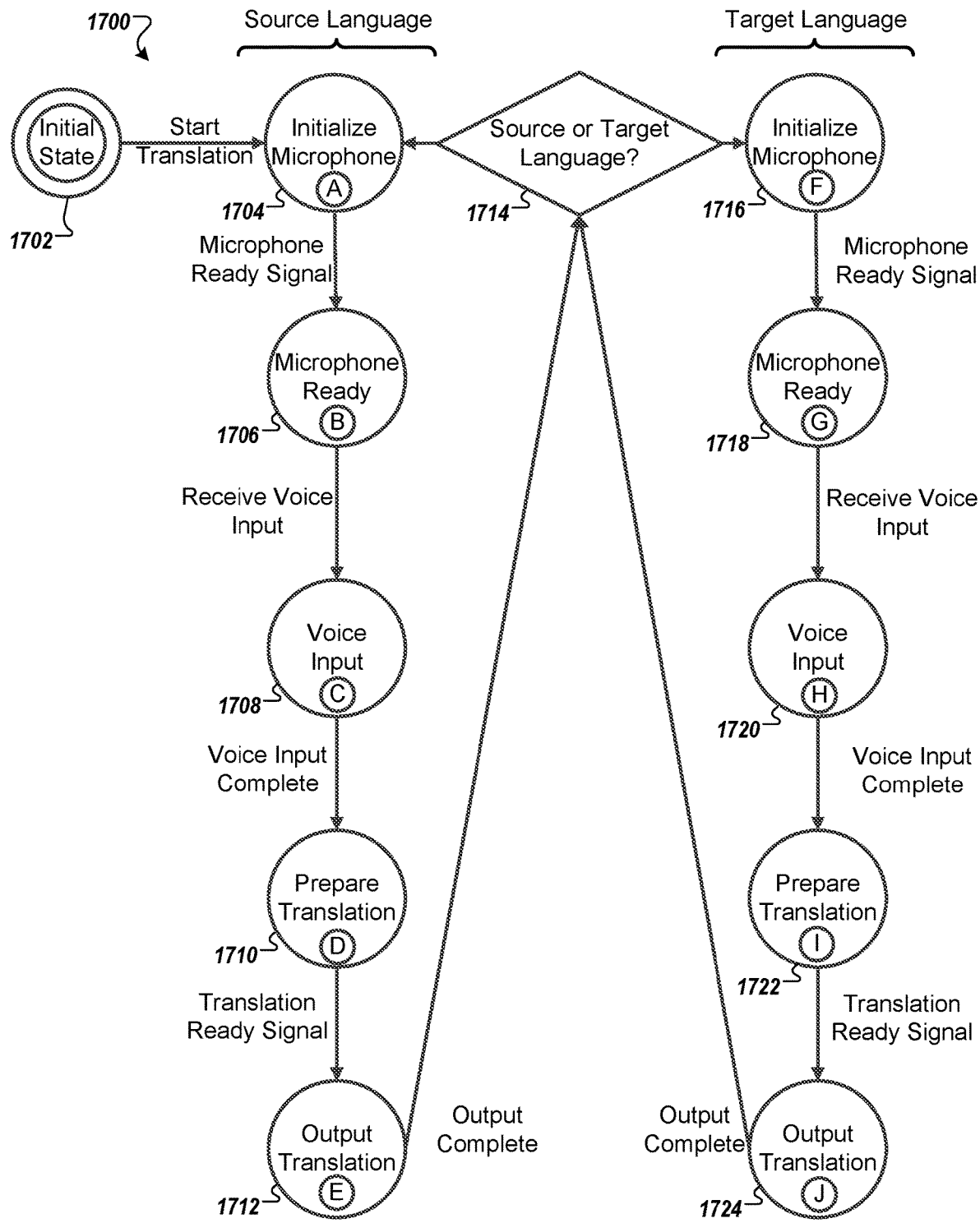
FIG. 17 is a state diagram illustrating an example of a user interface for translating between languages.

FIG. 17 shows a state diagram 1700 illustrating an example of a user interface for translating between languages. The various states in the state diagram 1700 correspond to the user interface states shown in FIGS. 1 to 11. The user interface starts in the initial state 1702 before receiving a command to start the translation process. In the initial state 1702, the microphone is off, the graphical representation 20 identifying the source language is in a default condition (e.g., a gray background and border), the microphone icon 30 is in a default condition, and the graphical representation 40 identifying the target language is in a default condition.

The start translation command may be, for example, a user gesture or voice command activating the language translation application such as illustrated in FIG. 1. In some implementations, the language translation application initiates a sequence for listening in the source language. Alternatively, the user may select whether the language translation application begins listening for the source language or the target language. For example, the user may begin or restart a sequence by tapping on the microphone icon 30. In particular, the language translation application may transition to state A to begin a new exchange and/or when there is an ongoing exchange and the previous language was the source language. On the other hand, when there is an ongoing exchange and the previous language was the target language, the language translation application may transition to state F.

In some implementations, a user may manually activate a single translation. For example, the primary user may perform an initial tap on the source language, in response to which the language translation application steps through states A to E below and then returns to the initial state (e.g., the language translation application listens for the source language, translates, speaks a translation into the target language, and then deactivates the microphone). Then, in response to a second tap on the source language, the language translation application again steps through states A to E and then returns to the initial state.

As shown in FIG. 17, upon receiving a start translation command, the user interface transitions to the initialize microphone state 1704 (state A) to prepare the language translation application to listen for the source language. The user interface 200 shown in FIG. 2 provides an example of state A. In state A, the graphical representation 20 identifying the source language may be outlined, the microphone icon 30 may have an animated outline, and the graphical representation 40 identifying the target language may be in a default condition (e.g., a gray background and border). Alternatively, in some implementations, the graphical representation 20 identifying the source language may be in a default condition.

Upon receiving a microphone ready signal (i.e., an indication that the language translation application is ready to listen for the source language), the user interface transitions to the microphone ready state 1706 (state B). The user interface 300 shown in FIG. 3 provides an example of state B. In state B, the graphical representation 20 identifying the source language may be highlighted, the microphone icon 30 may have be highlighted, and the graphical representation 40 identifying the target language may be in a default condition.

In state C, a user may interrupt the sequence by tapping on the graphical representation 20 identifying the source language. In this case, the language translation application may leave the microphone on (e.g., remain in state C) but cancel any pending transcription, translation, or spoken output. Alternatively, a user may interrupt the sequence by tapping on the graphical representation 40 identifying the target language. In this case, the language translation application may leave the microphone on, transition to state G (e.g., listening for input in the target language), and cancel any pending transcription, translation, or spoken output. As another alternative, a user may interrupt the sequence by tapping on the microphone icon 30. In this case, the language translation application may transition back to the initial state 1702 and turn the microphone off while leaving any already transcribed text on the user interface.

Upon receiving a voice input signal from the primary user, the user interface transitions to the voice input state 1708 (state C), in which the language translation application is receiving a voice signal and performing speech recognition (and translation in some implementations). The user interface 400 shown in FIG. 4 provides an example of state C. In state C, the graphical representation 20 identifying the source language may be highlighted, the microphone icon 30 may have be highlighted and animated (e.g., using a pulse effect or other animation), and the graphical representation 40 identifying the target language may be in a default condition.

Upon receiving a voice input complete signal (e.g., the language translation application detects a speech endpoint and/or the primary user manually indicates the end of the voice input), the user interface transitions to the prepare translation state 1710 (state D), in which the language translation application is preparing to output a spoken translation of the primary user's speech. The user interface 500 shown in FIG. 5 provides an example of state D. In state D, the graphical representation 20 identifying the source language may be in a default state, the speaker icon 50 (which has replaced the microphone icon 30) may have an animated outline, (e.g., using a spinning effect or other animation), and the graphical representation 40 identifying the target language may be in a default condition. Alternatively, the graphical representation 20 identifying the source language may also be outlined.

Upon receiving a translation ready signal (e.g., the language translation application receives or generates an audio signal corresponding to a translation of the primary user's speech into the target language), the user interface transitions to the output translation state 1712 (state E), in which the language translation application is outputting a spoken translation of the primary user's speech. The user interface 600 shown in FIG. 6 provides an example of state E. In state E, the graphical representation 20 identifying the source language may be in a default state, the speaker icon 50 may be highlighted, and the graphical representation 40 identifying the target language may be in a default condition. In some implementations, the speaker icon 50 may also be animated (e.g., using a pulse effect or other animation). In some implementations, the speaker icon 50 may be in a default condition. Alternatively, the graphical representation identifying the source language may also be outlined.

Upon receiving an output complete signal, the language translation application determines in step 1714 whether to listen for the source language or the target language. The language translation application may, for example, use round robin scheduling or an auto-switching approach to select the target language if the previous transcription was of the source language, and vice versa. This scheduling approach may be desirable to model a back-and-forth exchange between the primary user and the participating user. The round robin scheduling approach may, for example, wait for a predefined period of time after the output is complete to listen for additional voice input; if additional voice input is received, the source language is used for translation; otherwise, the target language is used for translation. In such an implementation, if the primary user begins speaking again, the language translation application could return to state 1704 when the delay is less than the predefined period of time, otherwise the language translation application would go to state 1716. Likewise, the scheduling approach could include a similar predefined time period for listening for additional input from the participating user. For example, the language translation application could wait for a predefined period of time after the participating user has spoken to listen for additional voice input; if additional voice input is received, the target language is used for translation; otherwise, the source language could be used for translation.

A primary user also may be able to selectively initiate a round robin scheduling approach. For example, when the language translation application is in the initial state, tapping on the target language may initiate automatic switching. Additionally, when a user taps the microphone icon 30 to pause the automatic switching behavior, tapping either language selection button may reinitiate the automatic switching behavior. In some implementations, once a user taps the target language and initiates automatic switching mode, the language translation application continues to switch languages after each endpoint is detected until the user exits voice input.

A user may interrupt the sequence at this point while the microphone is off by tapping on the graphical representation 20 identifying the source language. In this case, the language translation application may automatically transition to state A. Alternately, a user may interrupt the sequence by tapping on the graphical representation 40 identifying the target language. In this case, the language translation application may automatically transition to state F.

Assuming that the language translation application decides to listen for the target language, the user interface transitions to the initialize microphone state 1716 (state F) to prepare the language translation application to listen for the target language. The user interface 700 shown in FIG. 7 provides an example of state F. In state F, the graphical representation 20 identifying the source language may be in a default condition, the microphone icon 30 may have an animated outline, and the graphical representation 40 identifying the target language may be outlined. Alternatively, in some implementations, the graphical representation 40 identifying the target language may also be in a default condition.

Upon receiving a microphone ready signal (i.e., an indication that the language translation application is ready to listen for the target language), the user interface transitions to the microphone ready state 1718 (state G). The user interface 800 shown in FIG. 8 provides an example of state G. In state G, the graphical representation 20 identifying the source language may be in a default condition, the microphone icon 30 may have be highlighted, and the graphical representation 40 identifying the target language may be highlighted.

In state G, a user may interrupt the sequence by tapping on the graphical representation 20 identifying the source language. In this case, the language translation application may transition to state C (i.e., listening for the source language) and cancel any pending transcription, translation, or spoken output. Alternatively, a user may interrupt the sequence by tapping on the graphical representation 40 identifying the target language. In this case, the language translation application may remain in state G (i.e., listening for the target language), but cancel any pending transcription, translation, or spoken output. As another alternative, a user may interrupt the sequence by tapping on the microphone icon 30. In this case, the language translation application may transition back to the initial state 1702 and turn the microphone off while leaving any already transcribed text on the user interface.

Upon receiving a voice input signal from the participating user, the user interface transitions to the voice input state 1720 (state H), in which the language translation application is receiving a voice signal and performing speech recognition (and translation in some implementations). The user interface 900 shown in FIG. 9 provides an example of state H. In state H, the graphical representation 20 identifying the source language may be in a default condition, the microphone icon 30 may have be highlighted and animated (e.g., using a pulse effect or other animation), and the graphical representation 40 identifying the target language may be highlighted.

Upon receiving a voice input complete signal (e.g., the language translation application detects a speech endpoint and/or the primary or participating user manually indicates the end of the voice input), the user interface transitions to the prepare translation state 1722 (state I), in which the language translation application is preparing to output a spoken translation of the participating user's speech. The user interface 1000 shown in FIG. 10 provides an example of state I. In state I, the graphical representation 20 identifying the source language may be in a default state, the speaker icon 50 (which has replaced the microphone icon 30) may have an animated outline, (e.g., using a spinning effect or other animation), and the graphical representation 40 identifying the target language may be in a default condition.

Upon receiving a translation ready signal (e.g., the language translation application receives or generates an audio signal corresponding to a translation of the participating user's speech into the source language), the user interface transitions to the output translation state 1724 (state J), in which the language translation application is outputting a spoken translation of the participating user's speech. The user interface 1100 shown in FIG. 11 provides an example of state J. In state J, the graphical representation 20 identifying the source language may be in a default state, the speaker icon 50 may be highlighted, and the graphical representation 40 identifying the target language may be in a default condition. In some implementations, the speaker icon 50 may also be animated (e.g., using a pulse effect or other animation).

Upon receiving an output complete signal, the language translation application returns to step 1714 to determine whether to listen for the source or target language.

Figure 18:
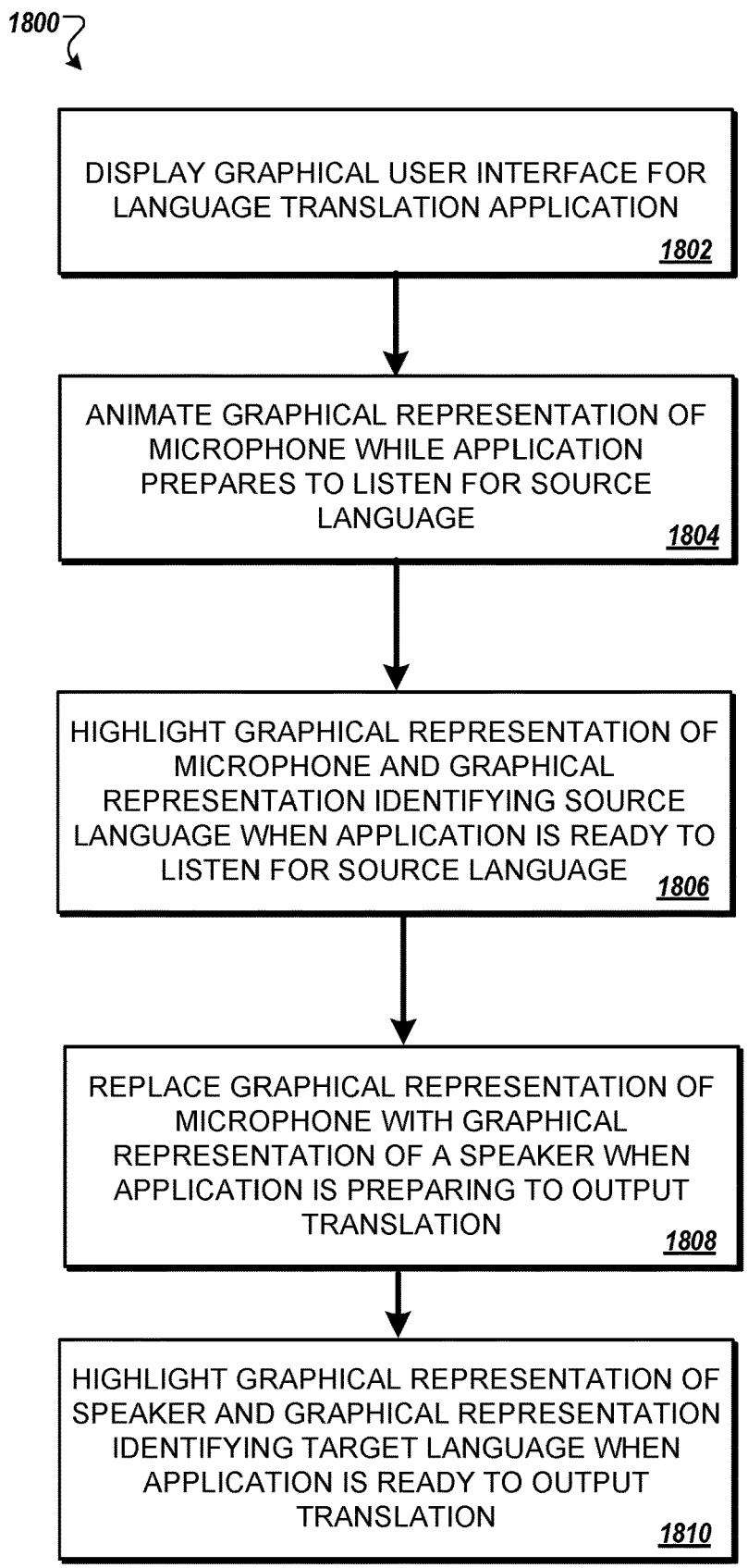
FIG. 18 is a flow is a flow diagram of an example process for translating between languages.

FIG. 18 is a flow diagram for an example process for translating between languages. The process 1800 shown in FIG. 18 may be performed by a user device, such as the user device 10 described above or another user device.

In step 1810, the user device displays a graphical user interface for language translation application. The graphical user interface includes a first graphical representation identifying or indicating a source language, a second graphical representation identifying or indicating a target language, and a graphical representation indicating a listening mode (e.g., a representation of a microphone, a microphone icon, an ear icon, text such as the letter "M" or the word "listening", or any suitable combination of these). The graphical representation indicating the listening mode may be adjacent to both the first graphical representation and the second graphical representation. In some implementations, the user device also may animate and/or outline the first graphical representation identifying the source language. The first graphical representation and the second graphical representation may indicate for example, a shape of a country, a flag of a country, and/or a name or representation of the speaker.

In step 1820, in response to a request to initiate listening for an utterance in the source language and/or in response to initiating preparations to listen for the source language, the user device animates the graphical representation indicating the listening mode while the language translation application prepares to listen for the source language.

Then, in step 1830, the user device highlights the graphical representation indicating the listening mode and the first graphical representation identifying or indicating the source language in response to the language translation application completing preparations to listen for the source language. This effectively creates a visual correspondence between the first graphical representation and the graphical representation indicating the listening mode. In some implementations, the user device also animates (e.g., using a pulse effect) the graphical representation indicating the listening mode. For example, a graphical representation of a microphone may pulse or otherwise animate in synchronization with a microphone of the user device receiving an audio signal.

Next, in response to the language translation application preparing an output of a translation of the utterance into the target language, the user device replaces the graphical representation indicating the listening mode with a graphical representation indicating a translation transcription mode (e.g., a representation of a speaker, a speaker icon, a mouth icon, text such as the letter "S" or the word "speaking", or any suitable combination of these) in step 1840. For example, a microphone icon may be removed from the user interface and a speaker icon may be placed in the same position that the microphone icon previously occupied.

Finally, in response to the language translation application completing preparations to output the translation of the transcription into the target language, the user device highlights the graphical representation indicating the translation transcription mode and the second graphical representation identifying or indicating the target language in step 1850. This effectively creates a visual correspondence between the second graphical representation and the graphical representation indicating the speaking mode. In some implementations, the user device may also animate the graphical representation indicating the speaking mode (e.g., using a pulse effect).

A number of implementations have been described. Nevertheless, it will be understood that various modifications may be made without departing from the spirit and scope of the disclosure. For example, various forms of the flows shown above may be used, with steps re-ordered, added, or removed. Defaults and preferences may be set to control whether the translation is spoken or rendered as text. In some implementations, manually tapping the speaker icon to stop the text from being spoken may display an actionable bar enabling users to change to the preference rather than stopping the spoken translation.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
providing, by a mobile device, a user interface for a real-time translation application that receives spoken inputs in a first language outputs and that generates synthesized speech representations of translations of the spoken inputs in a second language, wherein the user interface includes:
a first language region for displaying transcriptions of the spoken inputs in the first language,
a second language region for displaying translations of the spoken inputs in the second language, and
an indicator region for displaying an icon that, when an outline of the icon is animated, indicates that a speaker of the mobile device is preparing to output synthesized speech representations in the second language but is not yet outputting synthesized speech representations in the second language, wherein the icon comprises a speaker icon whose outline is animated in a spinning pattern only for a period of time before the speaker is prepared to output synthesized speech representations in the second language;
determining, by the mobile device, a state of the real-time translation application; and
in response to determining the state of the real-time translation application, updating, by the mobile device, the user interface to animate the outline of the icon to indicate that the speaker of the mobile device is preparing to output synthesized speech representations in the second language but is not yet outputting synthesized speech representations in the second language.

2. The method of claim 1, comprising:
receiving a particular spoken input; and
updating (i) the first language region of the user interface to display a transcription of the particular spoken input in a first language, and (ii) the second language region of the user interface to display a translation of the particular spoken input in a second language.

3. The method of claim 1, wherein the mobile device includes an automated speech recognizer, and an automated language translator.

4. The method of claim 3, wherein the automated speech recognizer comprises a continuous speech recognizer.

5. The method of claim 1, wherein the icon is user-selectable to manually activate or deactivate the speaker or a microphone.

6. The method of claim 1, wherein the first language region is further for displaying translations of spoken inputs in the second language, in the first language.

7. A system comprising one or more computers and one or more storage devices storing instructions that are operable, when executed by the one or more computers, to cause the one or more computers to perform operations comprising:
providing, by a mobile device, a user interface for a real-time translation application that receives spoken inputs in a first language outputs and that generates synthesized speech representations of translations of the spoken inputs in a second language, wherein the user interface includes:
a first language region for displaying transcriptions of the spoken inputs in the first language,
a second language region for displaying translations of the spoken inputs in the second language, and
an indicator region for displaying an icon that, when an outline of the icon is animated, indicates that a speaker of the mobile device is preparing to output synthesized speech representations in the second language but is not yet outputting synthesized speech representations in the second language, wherein the icon comprises a speaker icon whose outline is animated in a spinning pattern only for a period of time before the speaker is prepared to output synthesized speech representations in the second language;

determining, by the mobile device, a state of the real-time translation application; and in response to determining the state of the real-time translation application, updating, by the mobile device, the user interface to animate the outline of the icon to indicate that the speaker of the mobile device is preparing to output synthesized speech representations in the second language but is not yet outputting synthesized speech representations in the second language.

8. The system of claim 7, wherein the operations comprise:

receiving a particular spoken input; and updating (i) the first language region of the user interface to display a transcription of the particular spoken input in a first language, and (ii) the second language region of the user interface to display a translation of the particular spoken input in a second language.

9. The system of claim 7, wherein the mobile device includes an automated speech recognizer, and an automated language translator.

10. The system of claim 9, wherein the automated speech recognizer comprises a continuous speech recognizer.

11. The system of claim 7, wherein the icon is user-selectable to manually activate or deactivate the speaker or a microphone.

12. The system of claim 7, wherein the first language region is further for displaying translations of spoken inputs in the second language, in the first language.

13. A computer-readable storage device storing software comprising instructions executable by one or more computers which, upon such execution, cause the one or more computers to perform operations comprising:

providing, by a mobile device, a user interface for a real-time translation application that receives spoken inputs in a first language outputs and that generates synthesized speech representations of translations of the spoken inputs in a second language, wherein the user interface includes:

a first language region for displaying transcriptions of the spoken inputs in the first language, a second language region for displaying translations of the spoken inputs in the second language, and an indicator region for displaying an icon that, when an outline of the icon is animated, indicates that a speaker of the mobile device is preparing to output synthesized speech representations in the second language but is not yet outputting synthesized speech representations in the second language, wherein the icon comprises a speaker icon whose outline is animated in a spinning pattern only for a period of time before the speaker is prepared to output synthesized speech representations in the second language;

determining, by the mobile device, a state of the real-time translation application; and in response to determining the state of the real-time translation application, updating, by the mobile device, the user interface to animate the outline of the icon to indicate that the speaker of the mobile device is preparing to output synthesized speech representations in the second language but is not yet outputting synthesized speech representations in the second language.

14. The device of claim 13, wherein the operations comprise:

receiving a particular spoken input; and updating (i) the first language region of the user interface to display a transcription of the particular spoken input in a first language, and (ii) the second language region of the user interface to display a translation of the particular spoken input in a second language.

15. The device of claim 13, wherein the mobile device includes an automated speech recognizer, and an automated language translator.

16. The device of claim 15, wherein the automated speech recognizer comprises a continuous speech recognizer.

17. The device of claim 13, wherein the icon is user-selectable to manually activate or deactivate the speaker or a microphone.

* * * * *